United States Patent
Murakami et al.

(10) Patent No.: US 6,526,949 B2
(45) Date of Patent: Mar. 4, 2003

(54) VALVE APPARATUS

(75) Inventors: Youichi Murakami, Ama-gun (JP); Naoki Kato, Nishikamo-gun (JP); Kouichi Nagaya, Nagoya (JP); Hiroyasu Kanamori, Nagoya (JP)

(73) Assignee: Denso Corporation, Aichi-Pref. (JP)

( * ) Notice: Subject to any disclaimer, the term of this patent is extended or adjusted under 35 U.S.C. 154(b) by 15 days.

(21) Appl. No.: 09/865,586

(22) Filed: May 29, 2001

(65) Prior Publication Data

US 2002/0005188 A1 Jan. 17, 2002

(30) Foreign Application Priority Data

May 30, 2000 (JP) .......................... 2000-159684

(51) Int. Cl.$^7$ .......................... F02M 59/46; C22C 38/00
(52) U.S. Cl. .......................... 123/506; 75/236; 148/318; 251/368
(58) Field of Search .......................... 123/446, 506; 251/368; 417/296, 440, 462, 505; 75/236; 148/316, 318

(56) References Cited

U.S. PATENT DOCUMENTS

| 5,534,081 A | * | 7/1996 | Takagi et al. ................ 148/325 |
| 5,759,227 A | * | 6/1998 | Takahashi et al. ............ 75/246 |
| 5,993,978 A | * | 11/1999 | Kim et al. ................... 428/553 |
| 6,082,317 A | * | 7/2000 | Takahashi et al. ....... 123/188.8 |

FOREIGN PATENT DOCUMENTS

| FR | 2794168 | 5/2000 |
| JP | 53-50002 | 5/1978 |
| JP | 62-251411 | 11/1987 |

* cited by examiner

Primary Examiner—Tony M. Argenbright
(74) Attorney, Agent, or Firm—Nixon & Vanderhye PC

(57) ABSTRACT

A valve body of a spill valve is constructed of steel having a martensitic structure and a needle constructed of steel in which hard particles are dispersed in a matrix having a martensitic structure. A hardness difference between the matrix and the hard particles is equal to or smaller than 1000. By reducing the difference in hardness between the matrix and the hard particles of the needle, projections and detachment of hard particles are prevented. Accordingly, the wear of the matrix and valve body resulting from exposed hard particle is precluded while ensuring hardness of the valve.

8 Claims, 3 Drawing Sheets

VALVE APPARATUS

CROSS-REFERENCE TO RELATED APPLICATION

The present invention is related to Japanese patent application No. Hei. 2000-159684, filed May 30, 2000; the contents of which are incorporated herein by reference.

FIELD OF THE INVENTION

The present invention relates to a valve apparatus, and more particularly, the present invention relates to a valve apparatus used in a fuel injection system of an internal combustion engine such as a diesel or gasoline engine or the like.

BACKGROUND OF THE RELATED ART

A valve apparatus used for controlling flow-in and flow-out of fuel such as a spill valve, a flow control valve or the like of a fuel injection pump, generally cuts a fuel flow path by sliding and seating a valve member on a tapered seat portion in a valve body. However, unlike lubricant, fuel is devoid of lubricity, and accordingly, by repeatedly opening and closing thereof there is the possibility of seizure or wear of the valve member or seat portion. Hence, in conventional sliding valve member members, seizure and wear resistant material is used. For example, a quenched and tempered material of SKH51 may be used. In a valve body having a seat, and in which the shape is complicated, a carburized material of SCr415 having excellent workability is used.

The quenched and tempered material of SKH51 comprising the valve member is very hard steel in which hard particles are dispersed in a matrix. It very effectively prevents valve member wear. However, depending on the construction, during low speed high load operation in which lubricity deteriorates, the seat portion (which is a counterpart member) is worn. For example, the drawback is caused when rotational movement of the valve member is not restricted and the valve member repeatedly impinges the seat portion from the vertical direction and slips in the rotational direction during valve closing. To counter this, the valve body material may be interchanged with a higher hardness material. However, since the workability of the valve body is deteriorated with harder material, the cost is increased.

Hence, the present inventors have reinvestigated the material used in a valve apparatus for controlling flow-in and flow-out of a fluid having low lubricity, as in a fuel injection system.

SUMMARY OF THE INVENTION

In light of these and other drawbacks, the present invention provides a valve apparatus in which seizure, wear or the like is not caused in a valve member or a valve body and for which fabrication and workability remains good. As such, a valve body is constructed of steel having a martensitic structure. The valve member for opening and closing a fluid flow path by sliding in the valve body is constructed of steel in which hard particles are dispersed in a matrix having the martensitic structures, and a difference in hardness (Hv: Vickers hardness) between the matrix and the hard particles is preferably equal to or smaller than 1000.

Conventional valve body wear is caused when the valve member is moved vertically and impinges on the seat portion. The matrix of the quenched and tempered material of SKH51 constituting the valve member is deformed or worn. As a result, coarse hard particles float up and grind the seat portion. In contrast thereto, according to the valve member of the present invention, a difference in hardness between the matrix and the hard particle is as small as Hv: 1000 or smaller and accordingly, deformation or wear by impingement is reduced. Therefore, the valve member hardness is made high by dispersing hard particles therein. Further, hard particles are prevented from projecting from the surface and grinding the valve body. Further, by making the valve body with the hard martensitic structure, sufficient hardness is provided. Hard particles are not included and accordingly, workability is excellent.

In another aspect, carbide particles having an average particle diameter equal to or smaller than 3 $\mu$m are used. When the average particle diameter is small, the hard particle is difficult to project or detach. Further, grinding of the counterpart member by exposed hard particles and wear is reduced.

In another aspect, the valve body is constructed of a carburized material of low carbon alloy steel or a carburized nitride material of low carbon steel and the valve member is constructed of a quenched and tempered material of high carbon chromium steel. For the carburized material of low carbon alloy steel constituting the valve body, there is a carburized material SCr415 or a carburized material of SCM420 and as a carburized nitride material of low carbon steel, there is a carburized nitride material of S10C. Further, for the quenched and tempered material of high carbon chromium steel constituting the valve member, there is a quenched and tempered material of SUJ1 or a quenched and tempered material of SUJ2.

In another aspect, the valve body includes a guide hole in which the valve member slides and a seat portion seated with the valve member for cutting the fluid flow path.

In another aspect, the valve member is driven electrically by a drive unit. As such, when closing the valve, impact received by the valve body may become large. Therefore, the advantages of the present invention become very much realized here.

In another aspect, the valve apparatus controls flow-in and flow-out of fuel in a fuel injection system. Generally, since fuel is devoid of lubricity, seizure or wear is liable to be caused and therefore, the effect of applying the present invention is enormous. Specifically, when the valve apparatus is used for a spill valve of a distribution type fuel pump, seizure or wear is prevented and the durability can be promoted significantly.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DESCRIPTION OF THE INVENTION

Figure 1A:
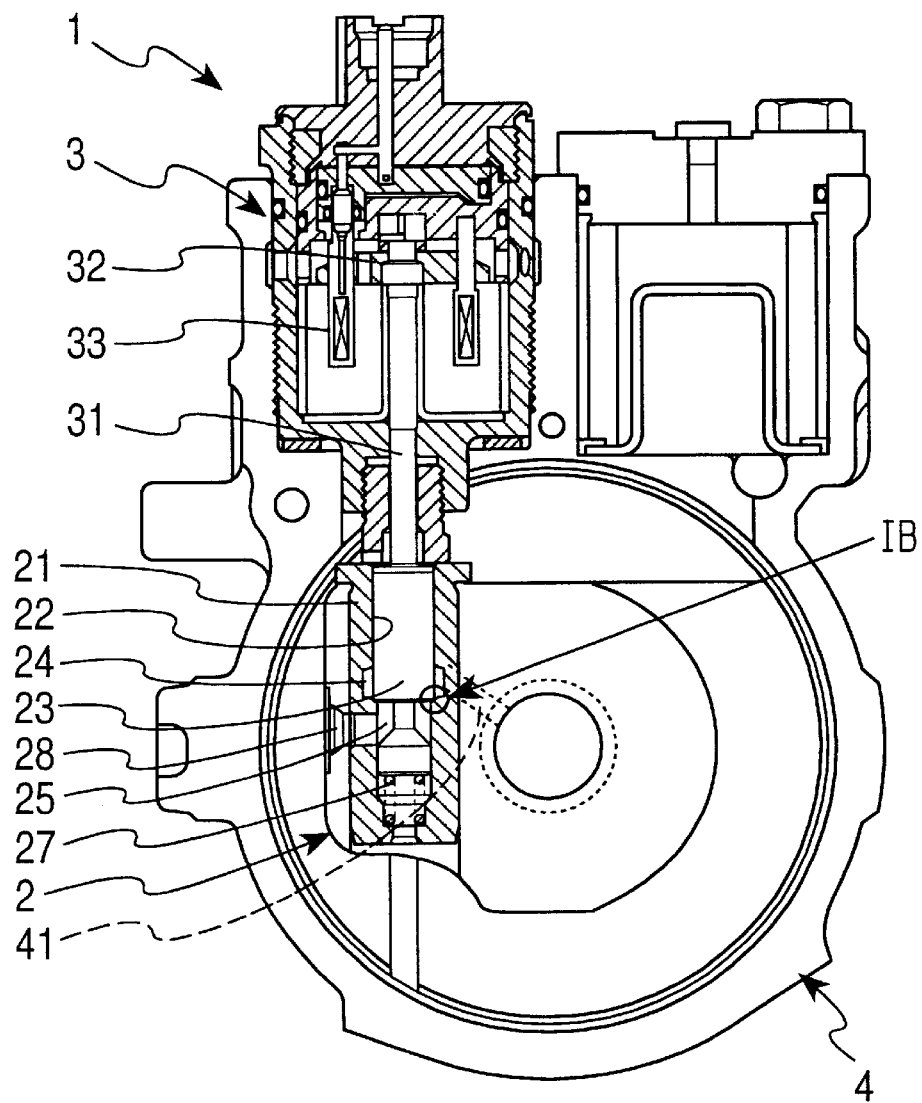
FIG. 1A is a cross sectional view of a distribution type fuel injection pump for a diesel engine using the valve apparatus according to the invention.

An explanation will be given of an embodiment of the present invention in reference to the drawings as follows. FIG. 1A shows a total constitution of a distribution type fuel injection pump of a vehicular diesel engine to which the present invention is applied and a valve apparatus according to the present invention is used as a spill valve 1. According to the spill valve 1, a lower half portion thereof constitutes a valve portion 2, an upper half portion thereof constitutes an electromagnetic drive unit 3 for driving to open and close the valve portion 2. By controlling the timing of opening and closing the valve portion 2 based on instruction from a control circuit, not illustrated, an injection amount of gas oil fuel injected from a pump to respective cylinders of the engine is controlled.

Figure 1B:
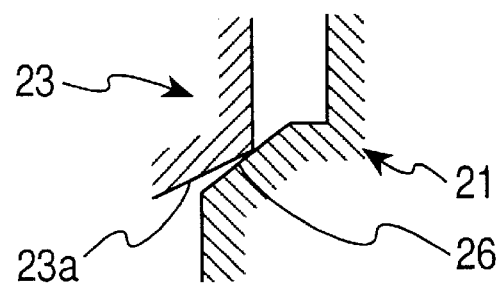
FIG. 1B is a magnified view of 1B in FIG. 1A.

The valve portion 2 is constructed of a slidable and pivotal needle 23 inside a valve body 21 having a cylindrical shape guide hole 22. A flow path 25 is formed in a ring-like shape surrounding a middle portion, the diameter of which is smaller than the diameter of the needle 23. The flow path 25 communicates with a fuel discharge path outside via a flow path 28 penetrating a side wall of the valve body 21. On an upper side of the ring-like flow path 25, a ring-like flow path 24 is formed by notching the inner periphery of the guide hole 22. And, the flow path 24 communicates with a fuel discharge flow path 41 inside pump main body 4. Between the ring-like flow path 24 and the ring-like flow path 25, as shown by FIG. 1B, a seat portion 26 is formed in an inverse taper shape. A valve portion 23a is formed in an inverse taper shape at an outer peripheral edge of the needle 23. The valve is seated thereon to thereby close a clearance therebetween.

A shaft member 31 is fixed to an upper face of the needle 23 and extends into the electromagnetic drive unit 3 thereabove. An armature 32 shaped as a circular disk, is fixed to an upper end of the shaft member 31 and is opposed to a coil 33. There is arranged a spring member 27 below the needle 23 for urging the needle 23 in a valve opening direction and in a normal state in which electricity is not conducted to the coil 33, the spill valve 1 is opened. When electricity is conducted to the coil 33, the armature is drawn in a lower direction and the needle 23 integral therewith is lowered to thereby close the valve (illustrated state). In the case of a distribution type pump, the spill valve 1 is closed in accordance with lift of a cam and the fuel discharge flow path 41 in the pump main body 4 is closed to thereby pressurize delivered fuel. Successively, when the spill valve 1 is opened, the fuel discharge flow path 41 communicates with an outside fuel discharge path and injection is finished. Therefore, by controlling a timing of opening the spill valve 1, an amount of injection can be controlled.

When fuel is injected, the needle 23 is opened and closed at a 0.4 through 1 ms time period. When the needle 23 is closed, the needle 23 first impinges on the seat portion 26 substantially from a vertical direction at high speed of 1.2 m/s. And, slippage creates a gap in the side face thereof (about 5 through 10 $\mu$m). In a conventional construction, wear on the seat portion is caused by the impulsive force substantially in the vertical direction and slippage.

Hence, according to the present invention, to restrain valve body wear, the needle 23 is made of steel having hard particles dispersed in a matrix having a martensitic structure. A difference in hardness between the matrix and the hard particles is equal to or smaller than 1000 in Vickers hardness (Hv). The martensitic structure of the matrix is normally a hard material having hardness (Hv) of about 400 through 1100 and the hardness can further be increased by dispersing the hard particles therein. However, where the hardness difference between the matrix and the hard particles is large, when the needle 23 impinges on the seat portion 26, the matrix is selectively deformed and worn thereby possibly exposing and detaching the particles. Therefore, it is preferable that the difference in hardness (Hv) therebetween does not exceed 1000.

Figure 2:
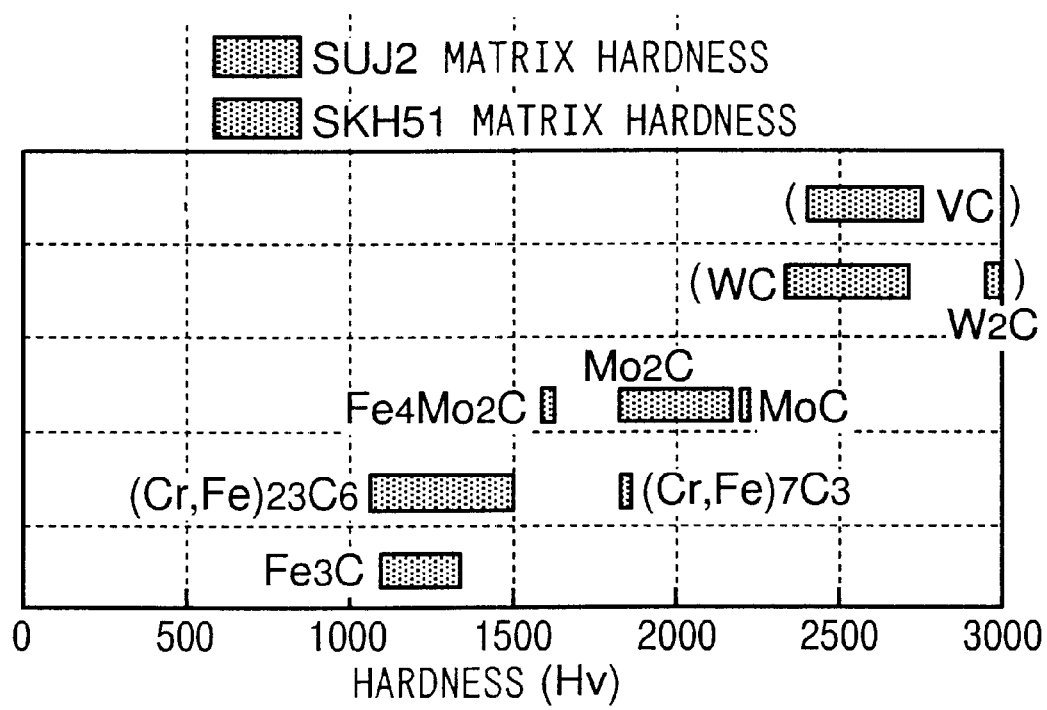
FIG. 2 is a diagrammatical view showing the relationship between composition and hardness of carbide particle for the invention.

A hard metal carbide is preferably used as the particle dispersed in the matrix. Specifically, one or two kinds or more of Cr, Fe, Mo and the like is used. Although hardnesses (Hv) of these hard particles differ by their compositions, as shown by FIG. 2, the hardnesses fall in a range of about 1000 through 2000 and by pertinently selecting the hardness in accordance with the hardness (Hv) of the matrix, the difference in hardness can be equal to or smaller than Hv: 1000. Further, when the particle diameter of the hard particle is large, exposure or detachment is possible. Seat wear of seat portion 26 is possible due to exposed particles. Accordingly, the average particle diameter is preferably equal to or smaller than 3 $\mu$m and the average particle diameter is more preferably equal to or smaller than 1 $\mu$m.

A quenched and tempered material of high carbon chromium steel, bearing steel such as quenched and tempered SUJ1, or quenched and tempered SUJ2 has the above properties. For example, the quenched and tempered material of SUJ2 comprises a combination of a matrix having a martensitic structure including C and Cr, and carbide particles [$(Cr, Fe)_{23}C_6$, average particle diameter: about 0.8 $\mu$m], as shown by FIG. 2, hardness (Hv) of the matrix is about 700, hardness (Hv) of the carbide particle [$(Cr, Fe)_{23}C_6$] of about 1100 through 1500. Therefore, above-described hardness difference Hv: 1000 or smaller is satisfied.

Further, in FIG. 2, according to a hard carbide (carbide of W, Mo) included in quenched and tempered SKH51, hardness is high (Hv: about 1800 through 3200) and the difference in hardness between the hard carbide and the matrix (Hv: about 700) exceeds Hv: 1000.

In the valve body 21 material formed with the seat portion 26, steel is used having a hard martensitic structure. Specifically, a carburized material of low carbon alloy steel such as a carburized material of SCr415, a carburized material of SCM420 or the like, or a carburized nitride material of low carbon steel such as a carburized nitride material of S10C or the like can be used. These materials have excellent workability and accordingly, are preferably used for a valve body 21 having a complicated shape. This reduces fabrication cost.

By using the above-described material for needle 23, regardless of the material of the seat portion 26, wear is restrained. Further, the material of needle 23 has high hardness by including the carbide particles. Therefore, wear of the needle 23 is restrained and durability can significantly be promoted.

EXAMPLE

Next, an actual machine test is provided by actually fabricating the spill valve 1 having the construction shown in FIG. 1 and integrating the spill valve 1 to a fuel injection pump. With the spill valve 1, the needle 23 material is a quenched and tempered SUJ2. The valve body 21 is carburized SCr415 (Embodiment 1). Further, for comparison, a spill valve 1 is provided where the needle 23 is a quenched and tempered SKH51, the conventional material and the material of the valve body 21 is constructed of a carburized material of SCr415 (Comparative Example 1). Table 1 shows compositions of the quenched and tempered material of SUJ2, the carburized material of SCr415 and the carburized material of SCr415.

TABLE 1

| Component | SKH51 | SUJ2 | SCr415 |
|---|---|---|---|
| C | 0.8–0.9% | 0.95–1.1% | 0.12–0.18% |
| V | 1.8–2.3% | — | — |
| W | 6.0–7.0% | — | — |
| Mo | 4.8–5.8% | — | — |
| Cr | 3.8–4.5% | 1.3–1.6% | 0.85–1.25% |
| Mn | — | — | 0.55–0.90% |

With regard to the spill valve 1 of Embodiment 1 and Comparative Example 1, a wear durability test is carried out of valve body 21 under a low speed and high load condition having low lubricity. Test conditions are as follows.

Figure 3A:
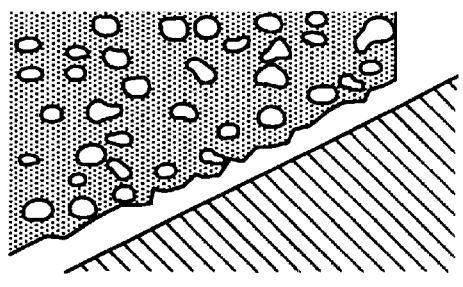
FIG. 3A is a schematic view of a surface of a needle and a seat portion showing the mechanism of causing wear according to the prior art.
Figure 3B:
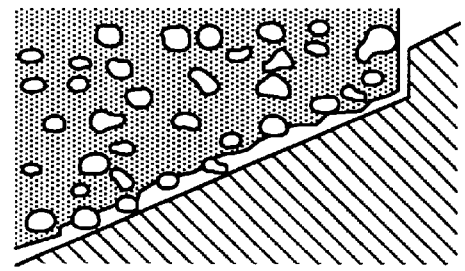
FIG. 3B is a schematic view of a surface of a needle and a seat portion showing the mechanism of causing wear according to the prior art.

Fuel: Kerosene
Pump rotational number: varied between 300 and 500 rpm
Injection amount: 100 mm$^3$/stroke
Injection time: 100 hours As a result, according to the spill valve 1 of Comparative Example 1, the amount of wear is 30 μm at the surface of the seat portion 26 of the valve body 21. In contrast thereto, according to the spill valve 1 of Embodiment 1, the wear amount at the surface of the seat portion 26 is significantly improved to be 0 μm. In this way, according to the present invention, surface wear of the seat portion 16 is prevented without changing the material of the valve body 21. A mechanism thereof will be shown below. FIGS. 3 and 4 illustrate schematic views of the surfaces of the needle 23 and seat portion 26 in the wear durability test in Comparative Example 1 and Embodiment 1. In Comparative Example 1 shown in FIG. 3, when the needle 23 first impinges on the seat portion 26, the matrix of the quenched and tempered SKH51 of needle 23 is selectively worn or deformed to bring coarse hard carbide (carbide of W, Mo: Hv=1800 through 3200, average particle diameter: 4 through 10 μm) in the quenched and tempered SKH51 to be projected or detached (FIG. 3A). Further, the projected coarse hard carbide grinds the surface of the seat portion 26 by continuous slippage in the rotational direction to thereby cause wear (FIG. 3B).

Figure 4A:
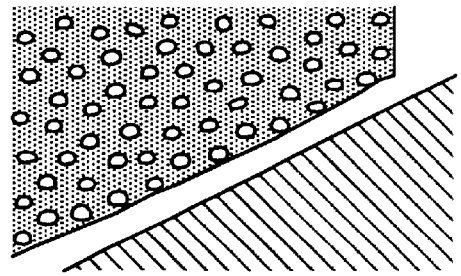
FIG. 4A is a schematic view of a surface of a needle and a seat portion for the present invention.
Figure 4B:
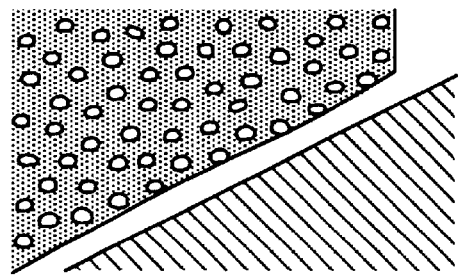
FIG. 4B is a schematic view of a surface of a needle and a seat portion for the present invention.

That is, in Comparative Example 1, the hard carbide is very hard and coarse compared with the matrix of the needle 23 and the material of the seat portion 26. Therefore, by repeated impact by relative vertical movement and slippage in the rotational direction, the hard carbide is exposed to the surface and grinds and wears the counterpart material. In contrast thereto, according to Embodiment 1, as shown in FIGS. 4(a) and 4(b), selective wear or deformation of the matrix is not seen. Also, projection or detachment of the hard carbide and wear is not caused on the surface of the seat portion 26. This is because the difference in hardness between the hard carbide of the needle 23 and the matrix is comparatively small. It is not only that the matrix is selectively worn or deformed. Further, the hard carbide is very small. And, even when the hard carbide is exposed to the surface, surface pressure applied to the surface of the seat portion 26 which is the counterpart material, is small and grinding operation thereby is not caused.

Although according to the first embodiment shown in FIG. 1, the needle is pivotally provided, slippage and wear is caused where a needle is restrained by, for example, a pin or the like such that the needle cannot pivot relative to the seat face. There is situations where the needle pivots when seated since there is produced slight play. However, the present invention prevents wear in this situation.

Further, according to the first embodiment, an example is provided where the present invention is applied to a spill valve for a fuel injection pump. However, the present invention may be applied to any valve apparatus used in a fuel injection system of an internal combustion engine such as a diesel engine, a gasoline engine or the like. For example, the present invention may be used on a pressure reducing valve, a flow control valve, a fuel injection valve. Further, any drive unit of a valve apparatus may be used other than the electromagnetic drive unit according to the first embodiment so far as the drive unit is provided with a constitution of electrically driving the valve member as in a drive unit of a piezoelectric type.

While the above-described embodiments refer to examples of usage of the present invention, it is understood that the present invention may be applied to other usage, modifications and variations of the same, and is not limited to the disclosure provided herein.

What is claimed is:

1. A valve apparatus comprising:
   a valve member for opening and closing a fluid flow path by sliding in a valve body, the valve body constructed of steel having a martensitic structure, the valve member constructed of steel in which hard particles are dispersed in a matrix having a martensitic structure, a difference in Vickers hardness between the matrix and the hard particle is equal to or smaller than 1000.

2. The valve apparatus according to claim 1, wherein the hard particles are carbide particles and an average particle diameter of said hard particles are equal to or smaller than 3 μm.

3. The valve apparatus according to claim 2, wherein the valve body comprises a carburized material of a low carbon alloy steel or a carburized nitride material of a low carbon steel and the valve member comprises a quenched and tempered material of high carbon chromium steel or bearing steel.

4. The valve apparatus according to claim 3, wherein the valve body comprises carburized SCr415 material, a carburized SCM420 material or a carburized nitride S10C material, the valve member comprises a quenched and tempered SUJ1 material or a quenched and tempered SUJ2 material.

5. The valve apparatus according to claim 1, wherein the valve body includes a guide hole in which the valve member slides and a seat portion seated with the valve member to cut a fluid flow path.

6. The valve apparatus according to claim 1, further comprising a drive unit for electrically driving the valve member.

7. The valve apparatus according to claim 1, wherein the valve apparatus controls flow-in and flow-out of fuel in a fuel injection system.

8. The valve apparatus according to claim 7, wherein the valve apparatus is a spill valve for a distribution fuel pump.

* * * * *